Patented Nov. 17, 1925.

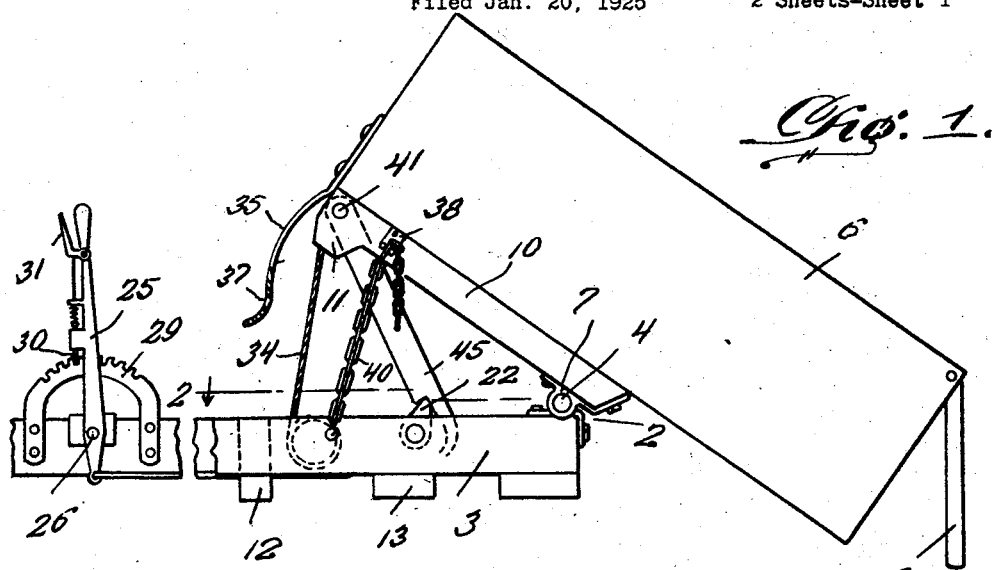
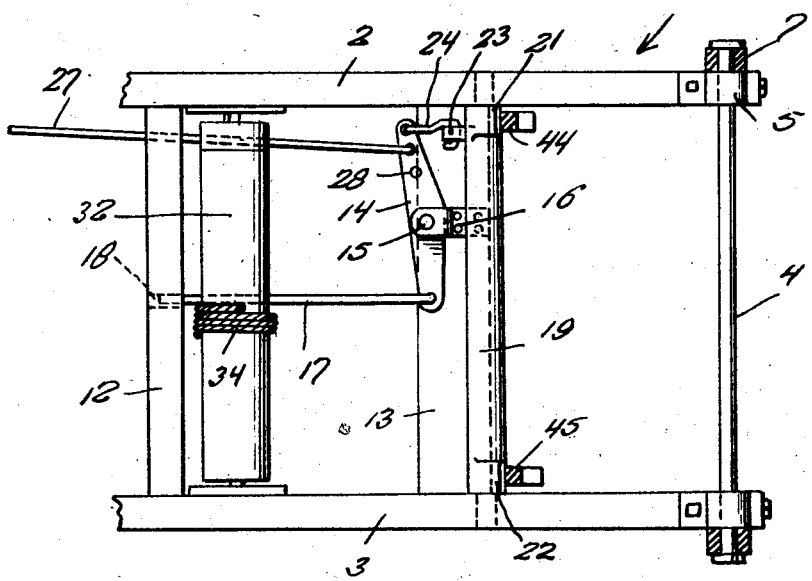
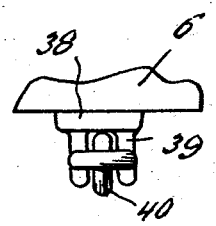

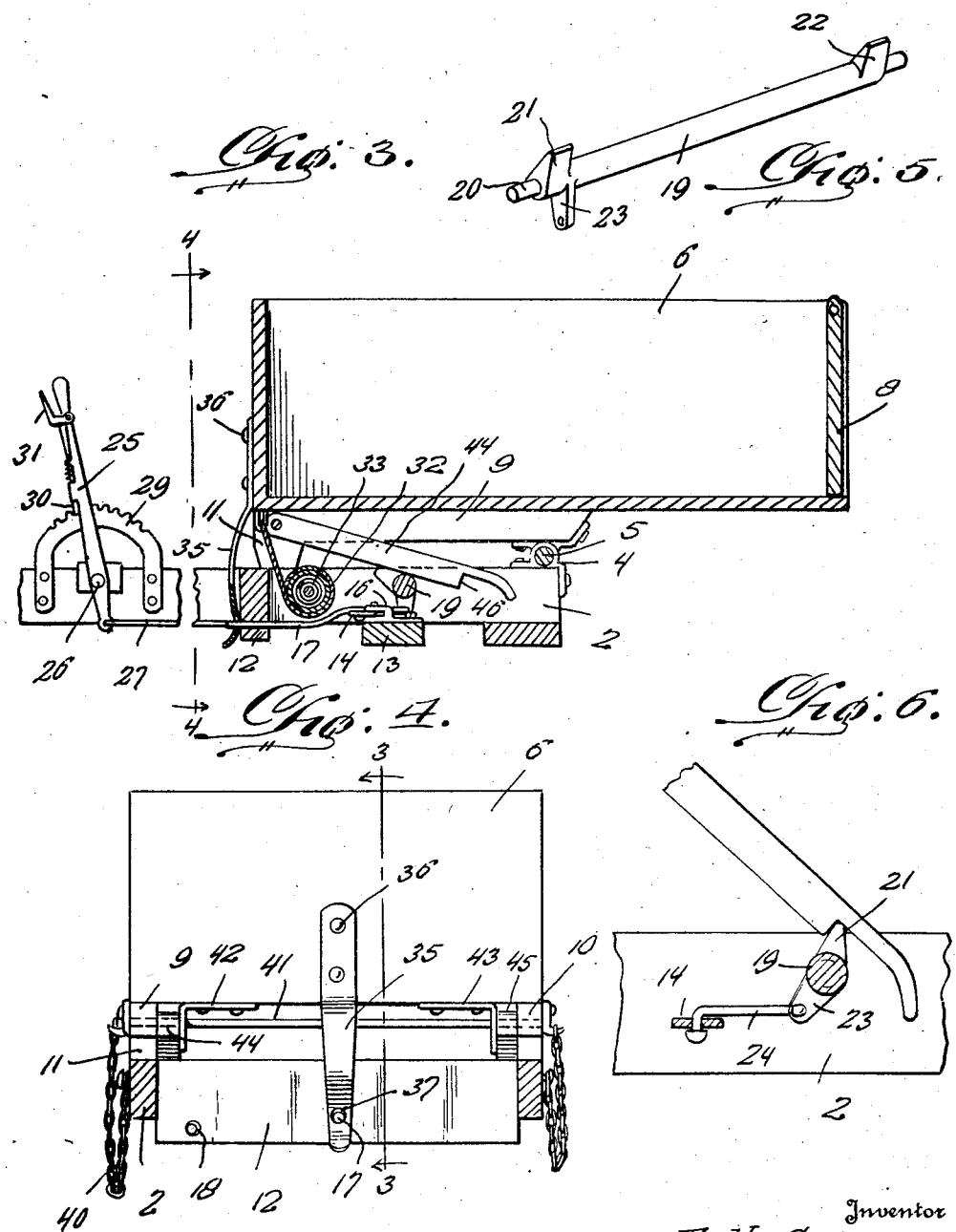

1,562,222

UNITED STATES PATENT OFFICE.

EVERETT H. GALFORD, OF ELKINS, WEST VIRGINIA.

DUMPING TRUCK.

Application filed January 20, 1925. Serial No. 3,614.

*To all whom it may concern:*

Be it known that I, EVERETT H. GALFORD, a citizen of the United States, residing at Elkins, in the county of Randolph and State of West Virginia, have invented certain new and useful Improvements in a Dumping Truck, of which the following is a specification.

This invention relates to improvements in dumping trucks and has for its principal object to provide a simple and efficient means whereby the body of the truck may be easily and readily tilted to a dumping position.

One of the important objects of the present invention is to provide a dumping truck of the above mentioned character, wherein means is provided for normally supporting the tilting body in a horizontal position on the chassis of a truck, the dumping body being supported on the rear end of the chassis in such a manner as to cause the same to be tilted to a dumping position, when the locking means is released, by its full weight.

A further object is to provide a dumping truck of the above mentioned character, wherein means is provided for limiting the upward swinging movement of the forward end of the dump body, additional means being provided for preventing the accidental return of the dump body to its normally horizontal position on the chassis while in a tilted position, still further means being provided for returning the dump body to its normal position after the contents of the body have been discharged therefrom.

A further object is to provide a dump truck of the above mentioned character, which is simple in construction, inexpensive, and furthermore adapted for the purposes for which the same is designated.

Other objects and advantages of this invention will become apparent during the course of the following description.

In the accompanying drawings forming a part of this specification and in which like numerals designate like parts throughout the same:

Figure 1 is a side elevation of the dump body and the supporting chassis therefor, the former being disposed in a tilting or dumping position.

Fig. 2 is a sectional view taken approximately on the line 2—2, Fig. 1.

Fig. 3 is a longitudinal sectional view through the dump body and the chassis, the section being taken approximately on the line 3—3, Fig. 4.

Fig. 4 is a sectional view taken approximately on the line 4—4, Fig. 3.

Fig. 5 is a detail perspective view of the trip mechanism.

Fig. 6 is a detail of the trip mechanism showing the manner in which the same cooperates with one of the arms, and Fig. 7 is a top plan view of the means for adjustably securing the upper end of each of the chains on the side of the forward portion of the dump body.

In the drawings wherein for the purpose of illustration is shown the preferred embodiment of my invention, the numeral 1 designates generally a portion of the usual chassis of a motor vehicle truck the same including the usual side rails, 2 and 3 respectively. A shaft 4 extends transversely across the rear ends of the side rails 2 and 3 of the chassis 1 and is journaled in suitable bearings 5. A dump body 6 is pivotally supported intermediate its ends on the outer ends of the shaft 4 as illustrated at 7. The rear end of the dump body is open and a pivoted closure 8 is provided therefor, the same being of any well known construction. A pair of longitudinally extending members 9 and 10 are secured on the bottom of the forward portion of the dump body 6 in a manner clearly illustrated in the drawings.

Downwardly extending projections 11 are formed on the forward ends of the longitudinally extending members and engage the upper edges of the respective side rails of the chassis when the dump body is in its normal horizontal position on the chassis.

A pair of cross bars 12 and 13 extend transversely between the side rails 2 and 3 of the chassis 1 and the same are arranged in spaced relation in the manner clearly illustrated in Fig. 2. A lever 14 is pivotally supported intermediate its ends as illustrated at 15 in a suitable bracket 16, the latter being secured on the cross bar 13. An elongated locking bolt 17 in the form of a rod is secured at its rear end to one end of the lever 14, the forward end of the locking bolt 17 being adapted for cooperation with a suitable opening 18 provided therefor in the cross bar 12 which is disposed forwardly of the cross bar 13. The purpose of this construction will also hereinafter be more fully described.

A shaft 19 has its respective ends reduced as illustrated at 20 and disposed within suitable openings provided therefor in the side rails 2 and 3 of the chassis 1, the shaft 19 being adapted for oscillatory movement between the side rails of the chassis. A pair of trip members 21 and 22 respectively are formed on the shaft 19 adjacent the ends thereof and further illustrated in Fig. 5. A downwardly extending ear 23 is also formed on the shaft 19 adjacent one end thereof. A link 24 affords a connection between ear 23 and the opposite end of the lever 14 for operatively associating the shaft with the lever. This construction is more clearly illustrated in Figs. 2 and 6 of the drawings.

The operating means for the lever 14 comprises a vertically arranged lever 25 the same being pivotally supported adjacent its lower end on the side rail 2 of the chassis 1 as illustrated at 26. The lower end of the lever 25 is connected to the lever 14 adjacent the link 24 through the medium of the elongated rod 27. As illustrated in Fig. 2, the lever 14 is provided with several openings 28 for receiving the rear end of the rod 27. A segmental rack 29 is secured on the side rail 2 for cooperation with the pawl 30 carried by the lever 25 and controlled by the auxiliary lever 31 in the manner well known in the art. The purpose of this construction is also well known in the art and a further detailed description thereof is not thought necessary.

A spring actuated drum 32 is adapted for rotation between the side rails of the chassis, a coil spring 33 being disposed within the drum 32, one end of the spring being secured to the shaft on which the drum is mounted and the other end secured to the drum in the manner well known. A cable or the like shown at 34 is adapted to be wound around the drum, one end thereof being secured to the drum while the other end is secured to the forward end of the dump body 6.

A keeper 35, the same being in the form of a spring arm, has its upper end secured to the forward end of the dump body 6 as illustrated at 36. The lower end of the keeper is adapted to fit against the front face of the cross bar 12 and an opening 37 is formed in the lower end of the keeper for registry with the opening 18 provided in cross bar 12 for receiving the forward end of the locking bolt 17 in the manner to be presently apparent.

For the purpose of limiting the upward swinging movement of the forward end of the dump body 6, there is provided on each of the longitudinally extending members secured on the bottom of the forward portion of the dump body the lug 38, the same being provided with a laterally extending bifurcated portion 39 for receiving and securing one of the links of the upper portion of each of the chains 40. The lower ends of the chains are secured to the respective side rails of the chassis as clearly illustrated in Fig. 4. The position of the bifurcated portion 39 for cooperation with the links of the free ends of the chains enables the chains to be adjustably secured to the forward portion of the dump body whereby the latter may be held at various heights when in a tilted position.

A rod 41 is extended transversely through the forward portions of the longitudinally extending members 9 and 10. A pair of angular plates 42 and 43 are secured on the bottom of the dump body 6 in spaced relation with respect to the longitudinally extending members 9 and 10 respectively, the downwardly extending portions of the angular plates having openings therein through which the rod 41 is adapted to extend. A pair of arms 44 and 45 are supported on their upper ends on the rod 41, the same being disposed between the longitudinally extending member 9 and the angular bracket 42, and the other longitudinally extending member 10 and the adjacent angular bracket 43 respectively. The lower end of each of the arms is cut away to provide a shoulder 46 for cooperation with the respective trip members mounted on the shaft 19 and the purpose thereof will be presently described.

Normally the dump body 6 is supported in a horizontal position on the rear portion of the chassis 1 and the dump body is held in such position through the medium of the locking bolt 17 the forward end of which extends through the opening 18 provided in the cross bar 12 and the opening 37 formed in the lower portion of the keeper 35. This construction is clearly illustrated in Fig. 3. For the purpose of dumping the contents of the body 6 after the truck has reached its designation, the lever 25 is actuated so as to move the same forwardly causing the lever 14 to swing on its pivot 15 whereby the bolt 17 will be retracted from the opening in the keeper 35. The weight of the dump body will thereby cause the same to swing or tilt on its pivot 4 so that the forward end of the dump body will swing upwardly into the position shown in Fig. 1. As heretofore more fully set forth, the chains 40 will cooperate with the bifurcated portions 39 of the lugs 38 in limiting the upward swinging movement of the forward end of the dump body. Simultaneously the cable 34 will be unwound and the coiled spring 33 in the drum will be placed under tension.

When the rod 27 is moved forwardly, the shaft 19 will be caused to rotate so as to bring the trip members 21 and 22 in an upward position whereby the same will engage the shoulders 46 on the lower portions of the arms 44 and 45 whereby means is provided for holding the dump body against its accidental return to its normal position on the chassis. This is clearly illustrated in Figs. 1 and 6 of the drawings.

After all of the contents of the dump body has been discharged therefrom and the dump body is empty, the cable 34 will return the forward portion of the dump body upon releasing the locking pawl 30 from the segmental rack 29 and permitting the lever 25 to be returned to its normal position, thus disengaging the trip members 21 and 22 from the shoulders formed on the lower ends of the arms 44 and 45 respectively.

The forward end of the dump body will descend until the projections 11 engage the upper edges of the side rails 2 and 3 of the chassis 1 whereupon the dump body will be disposed horizontally on the rear end of the chassis. The opening 37 in the lower portion of the keeper 35 will then be in alinement with the opening 18 in the cross bar 12 and upon actuating the lever 25, the forward end of the locking bolt 17 will be brought into engagement with the opening in the keeper, thus preventing unlocking the dump body against any upward movement at its forward end.

It will thus be seen from the foregoing description, that a dumping truck has been provided which will at all times be positive and efficient in its operation, and will further save considerable time and labor in moving the dump body to an operative or inoperative position. The operating lever 25 is adapted to be disposed within easy access of the driver of a truck.

While I have shown the preferred embodiment of my invention, it is to be understood that various changes in the size, shape and arrangement of parts may be resorted to without departing from the spirit of the invention and the scope of the appended claims.

Having thus described the invention, what I claim as new is:—

1. In combination with the chassis of a vehicle, of a dump body pivotally supported intermediate its ends on the rear end of the chassis, means for normally locking the dump body in a horizontal position on the chassis against tilting movement, said means comprising a pair of cross bars extending transversely on the chassis in spaced relation, a lever pivotally supported intermediate its ends on the rear cross bar, a locking bolt secured at its rear end on one end of the lever, the forward end thereof adapted for slidable movement within an opening provided therefor in the forward cross bar, a keeper associated with the forward end of the dump body, the same being provided with an opening for receiving the forward end of the locking bolt, and a lever operatively associated with the other end of the aforementioned lever for actuating said locking bolt.

2. In combination with the chassis of a vehicle, of a dump body pivotally supported intermediate its ends on the rear end of the chassis, means for normally locking the dump body in a horizontal position on the chassis against tilting movement, said means comprising a pair of cross bars extending transversely on the chassis in spaced relation, a lever pivotally supported intermediate its ends on the rear cross bar, a locking bolt secured at its rear end on one end of the lever, the forward end thereof adapted for slidable movement within an opening provided therefor in the forward cross bar, a keeper associated with the forward end of the dump body, the same being provided with an opening for receiving the forward end of the locking bolt, a lever operatively associated with the other end of the aforementioned lever for actuating said locking bolt, and means for preventing the accidental return of the forward end of the dump body to its normal position when the body is in a tilted position, said last mentioned means comprising a pair of arms pivotally supported at their upper ends on the forward end of the bottom of the dump body, the lower ends of said arms being provided with shoulders, and a trip mechanism supported on the chassis for cooperation with said shoulders, said trip mechanism being operatively associated with the first mentioned lever.

In testimony whereof I affix my signature.

EVERETT H. GALFORD.